United States Patent [19]

Cieutat et al.

[11] Patent Number: 5,702,678
[45] Date of Patent: Dec. 30, 1997

[54] METHOD FOR OPTIMIZING THE TEMPERATURE OF A CLAUS UNIT

[75] Inventors: Denis Cieutat, Neuilly-sur-Seine, France; Emmanuel Schmidt, Houston, Tex.

[73] Assignees: L'Air Liquide, Paris Cedex, France; Air Liquide America Corporation, Walnut Creek, Calif.

[21] Appl. No.: 673,033

[22] Filed: Jul. 1, 1996

Related U.S. Application Data

[63] Continuation of Ser. No. 228,238, Apr. 15, 1994, abandoned.

[51] Int. Cl.$^6$ ............ B01D 53/50; B01D 53/52; C01B 17/50; C01B 17/69
[52] U.S. Cl. ............ 423/567.1; 423/242.1; 423/540; 423/542; 423/574.1; 423/DIG. 2
[58] Field of Search ............ 423/242.1, 511, 423/540, 542, 567.1, 574.1, DIG. 2, DIG. 5

[56] References Cited

U.S. PATENT DOCUMENTS

| | | | |
|---|---|---|---|
| 3,359,069 | 12/1967 | Furkert | 23/178 |
| 4,490,347 | 12/1984 | Gelbum | |
| 4,543,245 | 9/1985 | Peterman et al. | 423/574 R |
| 4,552,747 | 11/1985 | Goar | 423/474 R |
| 4,620,967 | 11/1986 | Tippmer | 423/236 |
| 4,684,514 | 8/1987 | Chen | 423/574 R |
| 4,826,670 | 5/1989 | Hegarty | 423/574 R |
| 5,022,332 | 6/1991 | Ding | 110/346 |
| 5,035,810 | 7/1991 | Heisel et al. | 210/750 |

FOREIGN PATENT DOCUMENTS

| | | |
|---|---|---|
| 0237216 | 9/1987 | European Pat. Off. . |
| 0237217 | 9/1987 | European Pat. Off. . |
| 561521 | 9/1993 | European Pat. Off. . |
| 9313362 | 7/1993 | WIPO . |

OTHER PUBLICATIONS

"SO2-generation process can double refinery Claus unit capacity" by Schendel, Oil and Gas Journal, Sep. 27, 1993, pp. 63–66.

*Primary Examiner*—Gary P. Straub
*Assistant Examiner*—Timothy C. Vandy
*Attorney, Agent, or Firm*—Burns, Doane, Swecker & Mathis, LLP

[57] ABSTRACT

A method is disclosed for treating sulfur containing waste streams, comprising:
  a) injecting said sulfur containing waste streams into a sulfuric acid regeneration unit so as to produce a sulfur dioxide containing effluent;
  b) passing a portion of said sulfur dioxide containing effluent to a Claus thermal reactor, and
  c) diverting a portion of said portion of said sulfur dioxide containing effluent of step b to a Claus catalytic reactor that is downstream from said Claus thermal reactor in an amount sufficient to maintain the average temperature in the Claus thermal reactor to be less than 3,250° F.

24 Claims, 1 Drawing Sheet

METHOD FOR OPTIMIZING THE TEMPERATURE OF A CLAUS UNIT

This application is a continuation of application Ser. No. 08/228,238, filed Apr. 15, 1994, now abandoned.

BACKGROUND OF THE INVENTION

The present invention relates to an industrial chemical process. More specifically, it relates to an integrated process for the processing of sulfur-containing streams using improved combustion techniques and apparatus.

Sulfur-containing streams are common among the chemical process industries, particularly in petroleum refineries. Also, in the chemical area, sulfur-containing streams are produced, for example, in large quantities during the manufacture of methyl methacrylate in the Acetone Cyanohydrin or "ACH" process, acrylonitrile in the ammoxidation process, acrylic esters, caprolactame, toluene diisocyanate, titanium dioxide and as a result of sulfonation and nitration reactions.

As used herein, the term "sulfur-containing fluid" includes any of the sulfur-containing fluids coming from any of many industries or processes which generates $SO_2$ when combusted. Another source of sulfur-containing streams is in the production and processing of natural gas, wherein $H_2S$ is present in various amounts and typically must be treated in a sulfur recovery plant.

In addition to sulfur-containing fluids which are produced by industrial processes such as hydrogen sulfide in natural gas and petroleum refinery gases, refinery processes themselves may utilize sulfur-containing compounds, such as sulfuric acid, to carry out various conversion processes. Due in part to changes in environmental regulations, some petroleum refineries are presently dealing with increasing quantities of sulfuric acid used in hydrocarbon conversion processes.

Along with the need to treat hydrogen-sulfide containing gases, refiners are also now severely restricted on the amount of butanes allowed in product gasoline, and therefore are faced with an increasing need to convert the $C_3$ and $C_4$ range hydrocarbons to higher hydrocarbons. Refiners use alkylation processes to produce valuable gasoline components from such lower hydrocarbons. In the refinery context, an alkylation unit combines an isoparaffin with an olefin. The result of the alkylation processes is consumption of lower weight hydrocarbons to produce a high octane "alkylate" which is blended into the product gasoline.

Although the refinery alkylation process can take place at high temperatures and pressures without a catalyst, modern refineries employ either a hydrofluoric or sulfuric acid catalyst to react isoparaffins such as isobutane or isopentane with olefins. During the refinery alkylation process, the liquid sulfuric acid catalyst becomes contaminated with various compounds, such as higher hydrocarbons, tars and water, causing the acid catalyst strength to decrease and alkylation reaction rate to drop.

When the acid concentration drops below a predetermined level, a portion of the acid must be removed and replaced with fresh sulfuric acid. Modern refineries produce from about 22 pounds of spent sulfuric acid per barrel of alkylate produced. The spent sulfuric acid removed is typically regenerated in an acid regeneration unit on the refinery site or off-site.

Typically, a Sulfuric Acid Regeneration ("SAR") plant comprises a furnace, a gas cleaning section, a converter, and an absorption unit. In the furnace, sulfuric acid is decomposed into sulfur dioxide, carbon dioxide and water in the presence of a fueled combustion flame. This is referred to as the regeneration or "regen furnace".

The gas cleaning section of the typical SAR plant eliminates particulates, residual $SO_3$, metal contaminants, and most of the water from the regen furnace effluent. The converter is typically provided to react sulfur dioxide with oxygen from air to produce sulfur trioxide, $SO_3$. Finally, an absorption tower contactor unit produces "regenerated" sulfuric acid and optionally oleum from the $SO_3$.

Sulfuric Acid Regeneration plant performance has been improved by providing an oxygen-enriched air to the regen furnace. U.S. Pat. No. 4,490,347 discloses a SAR process using oxygen-enriched air. U.S. Pat. No. 5,022,332 discloses a recirculation scheme to dilute the feed to the regen furnace and reduce the flame temperature.

WO 92/02330, published Jul. 8, 1993, discloses a process for effecting oxidation in a regen furnace using $O_2$ enriched air or pure oxygen. The process described in WO 92/02330 is licensed by L'Air Liquide S. A., and is in commercial operation.

Claus process plants react hydrogen sulfide with sulfur dioxide to form sulfur vapor and water according to the net equation:

Claus-type plants are in use in refineries to treat gases containing hydrogen sulfide. The typical Claus plant comprises at least one furnace, or "thermal reactor", and multiple converters to produce an elemental sulfur product and result in a "tail gas" comprising residual unconverted hydrogen sulfide, other minor sulfur compounds, sulfur dioxide and inert gases. Some Claus plants may also comprise more than a single thermal reactor. Claus plant performance and capacity have been increased by the utilization of an oxygen-enriched air in the furnace. EP 0237 216 A1 published Sep. 16, 1987, discloses one such modified Claus process using oxygen-enriched air.

While faced with need to expand capacity, refineries are often limited by both physical space and environmental restraints from expanding capacity of these process units, for example, by the addition of furnaces or converters.

In an article by Schendel, "$SO_2$-generation process can double refinery Claus unit capacity", Oil and Gas Journal, Sep. 27, 1993, page 63, it is suggested to install a sulfur dioxide generation unit by releasing a stream of oxygen beneath the surface of a pool of boiling sulfur. The Schendel article discloses mixing the produced sulfur dioxide gas with hydrogen sulfide gases in a feed to a Claus unit.

In view of a continuing and increasing need for economic processing of sulfur containing waste streams, an improved process is much desired.

SUMMARY OF THE INVENTION

In accordance with one aspect of the present invention, a process for treating sulfur-containing streams comprises the steps of recovering a $SO_2$-containing gas from a sulfuric acid treatment plant; feeding a hydrogen-sulfide containing gas to a thermal reactor of a Claus plant; reacting at least a portion of the $SO_2$-containing gas in the thermal reactor; and, recovering a sulfur product from the Claus plant.

The preferred embodiment of the present invention comprises injecting the $SO_2$-rich gas effluent from the regen furnace of a sulfuric acid treatment plant into the thermal reactor and/or the catalytic reactor of a Claus-type plant in order to increase the Claus plant capacity and/or to control the temperature of the furnace. Preferably, at least a portion of the $SO_2$-containing gas is generated from a SAR regen furnace, which furnace is also fed with enriched air or preferably pure oxygen. The present invention thus provides an advantageous method for treating spent sulfuric acid, and furthermore allows the increased capacity or "debottlenecking" of a Claus unit.

In preferred embodiments, oxygen or oxygen-enriched air is also injected at the inlet of the Claus unit in quantities which are a function of sulfur dioxide flowrate to the thermal reactor to control the conversion of $H_2S$ and limit the temperature of the thermal reactor.

Moreover, with the embodiments which include feeding the SAR regen furnace with oxygen-enriched air or pure oxygen, the cost of the regen furnace is minimized. Furthermore, with oxygen-enriched air or pure oxygen feed to the SAR regen furnace, the quantity of inerts present in the flow of $SO_2$-rich gas to the Claus thermal reactor and therefore, downstream Claus converters is minimized, thus adding to the advantages of the process of the present invention.

Major savings in investment are possible from practice of the present invention if, among other factors, the facility operator does not have to invest in gas cleaning, converter and absorber sections downstream of the SAR regen furnace of an acid regeneration plant. Furthermore, minimal capital investment in new plant equipment is required to implement the present process in a commercial facility. The investment in many cases is limited to a minimum number of new or modified flowlines and burners and perhaps a new or modified process control system.

Monitoring or otherwise determining stream constituents during the operation of the thermal reactor in the Claus plant may be carried out in several embodiments, to then adjust the operation of the SAR plant, or sulfuric-containing stream source operation, based upon the monitored or determined Claus plant variables.

Sulfur-containing gas, acid gas and Sour Water Stripper (SWS) gas which are treated in the Claus unit are themselves typically saturated with water vapor. Although the Claus unit usually operates with some water and some other impurities in the process gas, in alternative embodiments of the present invention, several other pieces of equipment such as a spray tower, a cooling tower, Electrostatic Precipitator, dryer or $CO_2$ removal system may be located downstream of the SAR regen furnace. The effect of the dryer is to reduce the water content and thus increase the relative concentration of sulfur dioxide in the feed to the Claus unit. The effect of the scrubber is to reduce or eliminate the residual particles. The effect of the cooler is to adjust the temperature of the $SO_2$-rich gas or adjusted to achieve integration with the sulfur recovery unit. The effect of $CO_2$ removal is to achieve an increased effective $SO_2$ concentration in the $SO_2$-containing gas.

Further benefits and advantages of the process of the present invention as claimed in the appended claims will become evident through the benefit of the following description and reference to the appended Figure.

DETAILED DESCRIPTION OF THE PREFERRED EMBODIMENTS

Figure 1:
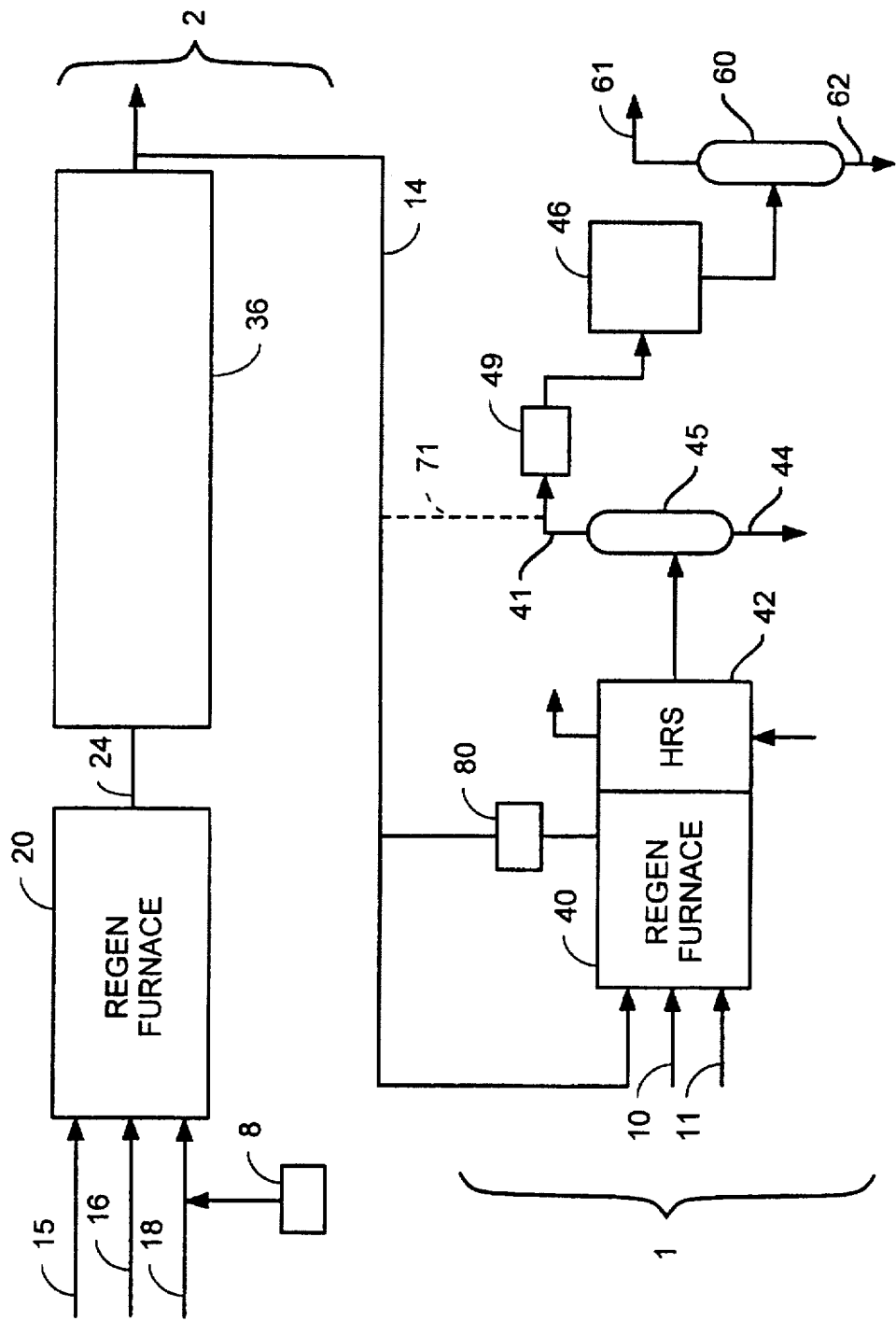
FIG. 1 represents schematically an installation for the practice of preferred embodiments of the present invention.

Referring now to FIG. 1 wherein the preferred embodiments of the process of the present invention are depicted; the process of the present invention is conceptually divisible into a sulfuric acid treatment area and an acid gas treatment area. In the acid gas treatment area 1, a thermal reactor 40 comprises a burner end and a waste heat boiler 42 at the opposing end. Typically, a Claus unit thermal reactor and boiler total heat input is between about 2 MW–80 MW.

By the term "Claus", it is meant the widely used industrial method of obtaining a sulfur product by the partial oxidation of gaseous hydrogen sulfide in the presence of an oxygen-containing gas to give a water and sulfur product. The thermal reactor 40 is fed a gaseous stream comprising hydrogen sulfide depicted in FIG. 1 as stream 10. The hydrogen sulfide-gas containing gas may be from a number of sources, for example, an amine unit or a sour water stripper column typical in a chemical process plant or petroleum refinery. Natural gas production and processing operations also are a major source of sulfur containing streams. Depending upon the source and the content of the hydrogen-sulfide-containing gas, air or an oxygen-containing gas is also fed to thermal reactor 40 at the burner end to maintain partial oxidation at a predetermined level.

In accordance with preferred embodiments of the present invention, an oxygen-enriched air is fed to the thermal reactor 40 of the Claus unit. Oxygen-enriched air via line 11 is employed to increase the capacity of the thermal reactor 40 to oxidize increased quantities of hydrogen-sulfide-containing gas.

Following partial oxidation in thermal reactor 40, hot gases are flowed from the burner end to the waste heat recovery section 42 of the Claus furnace. Steam is typically produced from feedwater by convection using well known heat recovery methods. Exhaust gases from the Claus furnace flow to separator 45, wherein an elemental sulfur-containing product may be separated and flowed via line 44 to a sulfur pit.

The catalytic conversion of sulfur dioxide to elemental sulfur is well known in the Claus method. The gaseous phase flows overhead from separator 45 via line 41 to be heated in heater 49 and converted to a sulfur product in at least one catalytic converter 46. Typically, following a plurality of catalytic conversion and sulfur separations steps, the "tail gas" is hydrogenated to substantially convert the remaining sulfur dioxide to hydrogen sulfide, prior to incineration of the hydrogen sulfide.

In accordance with the present invention, thermal reactor 40 is further supplied a sulfur-dioxide-containing gas; which gas is preferably recovered from a sulfuric acid regeneration ("SAR") process. Referring still to FIG. 1, a preferred sulfuric acid regeneration process 2 is depicted wherein a regeneration furnace 20 is supplied a sulfuric-acid-containing stream via line 15 and optionally fuel via line 16 and oxygen-containing gas via line 18 which together in the regen furnace dissociate the sulfuric acid to produce a sulfur-dioxide-containing gas which flows from the regeneration furnace 20 via line 24.

A typical temperature of the gaseous combustion products at the regen furnace outlet is about 2000° F. A typical composition of the $SO_2$-rich gas leaving a SAR regen furnace utilizing pure oxygen, prior to any drying operation, is shown below:

| component | % by volume |
|-----------|-------------|
| $SO_2$    | 22%         |
| $H_2O$    | 45%         |
| $CO_2$    | 25%         |
| $O_2$     | 2%          |
| $N_2$     | 6%          |

A typical $SO_2$ content of the $SO_2$-rich gas leaving a SAR regen furnace using air is about 8 to 12% by volume. Such $SO_2$ content is far below the 21% of $O_2$ content in air, even if water is removed, and therefore cannot provide any debottlenecking effect on the Claus unit.

By contrast, the $SO_2$ content of a regen furnace utilizing $O_2$-enriched air or pure oxygen produces a stream having a $SO_2$ content of between about 22% and up to about 40% if the stream is dried. This aspect is very advantageous in the practice and achieving the benefits of the present invention.

Among other factors, the practice of the present invention enables several operational advantages with respect to the effluent from the SAR regen furnace. The SAR regen furnace is preferably operated to maximize the $SO_2$ content of the $SO_2$-rich gas. This is preferred because the rate of debottlenecking of the Claus unit is a function to the $SO_2$ content of the gas. Depending on the amount of $SO_2$ generated from the SAR regen furnace, a portion may selectively be flowed to and injected in the Claus thermal reactor, and the second portion of the effluent flowed directly to one of the catalytic converters of the Claus unit, to be directly converted to sulfur.

Water in the acid regeneration plant furnace effluent cumulates with the water already typically present in the acid gas feed to the thermal reactor and would, in most cases, further enhance the quenching effect of $SO_2$. However, a large water content in the feed to the thermal reactor may have an adverse effect on the hydrogen sulfide conversion and more importantly could have an impact on the pressure drop of the entire Claus unit. Accordingly, a dryer may be provided in alternate embodiments, as depicted in FIG. 1 as included in element 36. Preferably, if a dryer is provided, a water content of between about 0.5 to 5.0 percent by volume is desired at the dryer outlet.

The $CO_2$ typically present in the gaseous effluent from the regen furnace is commensurate with that usually present in refinery acid gas at the level of between about 2 percent and about 25 percent. If the $CO_2$ content of the $SO_2$-containing gas from the regen furnace is too high to allow an adequate integration with the Claus unit, one of several methods may be used to reduce it; for example, a caustic wash column. Other unit operations such as an electrostatic precipitator (ESP), or cooling tower, may be employed in the gas cleaning section to adjust the conditions of the SAR regen effluent. The gas treatment operations are collectively depicted in FIG. 1 as gas treatment element 36.

Residual oxygen present in the regen furnace effluent which, according to the present invention, is injected in the thermal reactor of the Claus unit as a part of this $SO_2$-rich gas will normally react with and be consumed by the compounds contained in the acid gas, such as $H_2S$. The advantageous result of the residual oxygen in the regen furnace effluent is a reduction in the quantity of oxygen (if any) required for the combustion of the acid gas in the Claus unit. If any amount of the sulfur-dioxide-containing gas is bypassed around the thermal reactor, as described above with reference to line 71, this amount should be adjusted so that the resulting $O_2$ content of the total process gas at the inlet of the catalytic converter will be very small, i.e. preferably preferably less than 0.01 percent (or less than 100 ppm), and will not significantly affect the life of the catalyst in the catalytic reactor.

Due to the dilution with the gas coming from the thermal reactor, the $O_2$ content of the above described total process gas at the converter section inlet will typically be less than the $O_2$ content of the $SO_2$-containing gas coming from the SAR regen furnace. In practice, it is therefore highly preferred to operate the regen furnace so as to minimize the $O_2$ content of the $SO_2$-rich gas in the regen furnace effluent.

Nitrogen present in the SAR plant gaseous effluent 14 normally will pass through the sulfur recovery plant section 1 unaffected. However, the presence of nitrogen dilutes the concentration of sulfur dioxide. As with water vapor, it is, therefore, preferable to maximize the $SO_2$ content of the $SO_2$-rich gas by minimizing the presence of nitrogen, by, for example, replacing air fed via line 18 to the regen furnace with oxygen-enriched air via oxygen source 8, or preferably pure oxygen.

None of the components typically present in the $SO_2$-rich gas stream 24 prevents this gas from being used in the Claus process. Preferably, the $SO_2$-rich gas should be injected in the Claus unit at about 15–20 psig. To obtain this pressure, either the SAR regen furnace may be pressurized or the effluent $SO_2$-rich gas itself could be compressed in conventional compression means.

The practice of the present invention is best accomplished with careful regard to the ratio of sulfur dioxide to hydrogen sulfide in the Claus thermal reactor. The maximum volume of $SO_2$ that can be fed to the Claus sulfur recovery section is normally equivalent to 50% of the total volume of $H_2S$ to be treated in the sulfur recovery section. We define the $H_2S/SO_2$ ratio as the quantity of $H_2S$ present in the acid gas 10 to be treated in the sulfur recovery unit divided by the quantity of $SO_2$ present in the $SO_2$-rich gas from the SAR regen furnace, at the inlet of the Claus thermal reactor.

If the $H_2S/SO_2$ ratio is very close to 2.0, no $H_2S$ which is feeding the sulfur recovery unit needs to be converted to $SO_2$, and no oxygen needs to be added to the thermal reactor. The mixed $H_2S$—$SO_2$ stream along with the impurities present in each of the individual streams can be fed directly to the first catalytic reactor provided that the temperature of the mixed stream falls in or is adjusted to the appropriate temperature range of about 400°–700° F., and that there is no ammonia present in the stream. In this case, no thermal sulfur is produced. Such bypass can only be made if the converter capacity is available, however. If the $H_2S/SO_2$ ratio is significantly above 2.0, the entire $SO_2$-rich gas stream can be injected in the thermal reactor and additional $O_2$ is preferably added in order to sustain the combustion and to convert a portion of $H_2S$ to $SO_2$, the downstream part of the sulfur recovery section being operated in the manner typical with Claus plants.

Lastly, if the $H_2S/SO_2$ ratio is only marginally above 2.0, only a small amount of $H_2S$ has to be burned with $O_2$ to reduce the ratio close to 2.0. This amount may be too small to sustain a stable combustion which means that there is a small range of $H_2S/SO_2$ ratio which is undesirable in the practice of the process, and thus the ratio should be adjusted.

In accordance with the present invention, by sending some of the excess $H_2S$ to the SAR regen furnace to be converted to $SO_2$ thereby driving back the $H_2S/SO_2$ ratio down to nearer 2.0, the overall process is improved. The most preferable control conditions for this process are for $H_2S/SO_2$ ratios significantly above 2.0, but the above described undesirable range can be reduced to a minimum by selecting burners which have extensive turndown capabilities. In practice, a minimum $H_2S/SO_2$ ratio should be calculated in each case to ensure the temperature is sufficiently great enough to trigger and sustain the thermal reaction. For example, at 1800° C., a 50% conversion is achieved, and at 2200° C., a 70% conversion is possible.

As shown in the above two paragraphs, there may be certain conditions in which the $SO_2$-rich gas will be preferably injected downstream of the thermal reactor and upstream of the catalytic converter of the sulfur recovery section, depicted in FIG. 1 by stream 71. The exact injection location, however, will be variable and a matter of choice according to the temperature of the process gas feeding the particular catalytic reactor.

It is preferred to install a $H_2S/SO_2$ control means 80 upstream of the inlet of the thermal reactor to ensure that the $H_2S/SO_2$ ratio is maintained above 2.0. If the $H_2S/SO_2$ ratio is below 2, excess $SO_2$-rich gas could be sent either to the sulfuric acid plant (if present) or to the tail gas treatment unit of the Claus unit, if the Claus unit has sufficient capacity.

The process of the present invention is advantageously flexible, and can be implemented for a wide range of feed conditions present for either the acid gas or the sulfuric stream to the SAR regen furnace provided, however, that the total flow rates do not exceed hydraulic limits of, for example, piping and fluid transfer equipment.

In sulfuric acid regeneration processes, prior to the present invention, the effluent gases from the regeneration furnace were typically then sent to a gas cleaning section to remove substantially the water contained therein and then through a catalytic conversion section wherein the sulfur dioxide is converted in the presence of oxygen to produce sulfur trioxide. The sulfur-trioxide-containing product was then passed to an absorption tower in which the sulfur trioxide is reacted in the presence of water to produce sulfuric acid and/or oleum by contacting in the absorption tower.

In accordance with preferred embodiments of the present invention, at least a portion of the sulfur-dioxide-containing gas recovered from the SAR regeneration furnace 20 of a sulfuric acid regeneration process is flowed to the thermal reactor 40 of a Claus process. The sulfur-dioxide-containing gas acts to limit the temperature rise in thermal reactor 40, which is typically the constraining factor in limiting the capacity of thermal reactor 40 to convert hydrogen-sulfide-containing gas to sulfur dioxide. Moreover, by diverting a portion, or the entire sulfur-dioxide-containing stream from the regeneration furnace 20, part of the downstream gas cleaning and absorption tower section may be reduced in capacity, idled or even eliminated.

Among other factors, the combined advantages of increasing capacity of hydrogen-sulfide-containing gas treatment plant, and eliminating equipment and operational expense of a sulfuric acid regeneration process, the process of the present invention affords a chemical plant or petroleum refinery operator a significant advantage over prior available processes.

Preferred embodiments of the process of the present invention afford further advantages and operational benefits. In one such preferred embodiment, oxygen-enriched air is supplied to the SAR regeneration furnace 20.

In accordance with the present invention, the oxygen-enriched air may be supplied to increase the sulfur dioxide content of the sulfur-dioxide-containing gas which is flowed to thermal reactor 40 of the Claus unit. The oxygen-containing air, or pure oxygen, is supplied to the regeneration furnace 20 according to operational requirement, such as measured average temperature of thermal reactor 40, to achieve an increased capacity to treat hydrogen-sulfide-containing gas supplied by the line 10 to thermal reactor 40.

In another embodiment, control means 80 monitors a temperature in thermal reactor 40, flow rate of sulfur-dioxide-containing gas in line 14 to thermal reactor 40, and the flow rate of hydrogen-sulfide-containing gas in line 10. Injection of oxygen-enriched air is thereby controlled by the control means 80 to maintain and advantageously increase the capacity of the Claus unit.

In another embodiment, a treatment section 36 which may comprise in any combination an ESP, cooling tower, dryer, $CO_2$ removal system, or adsorption tower may be provided to adjust the composition and temperature of the $SO_2$-containing gas exiting regeneration furnace 20 to achieve a higher net effective $SO_2$ concentration and thus further improve performance of the Claus unit.

It is a somewhat common practice for refiners to inject Sour Water Stripper ("SWS") gas into the Claus unit. It is also a common practice for those refiners who have a sulfuric acid regeneration plant to inject the SWS gas in the SAR regen furnace. In accordance with the present invention, additional advantages such as increased flexibility or additional tuning may be realized by injecting a predetermined portion of the SWS gas into the thermal reactor, or by splitting the SWS gas between the SAR regen furnace and the Claus thermal reactor depending on the quantity of $SO_2$ available from the SAR regen furnace, the $H_2S$ quantity to be treated in the Claus unit and the ammonia destruction required.

As a result, the integrated process of the present invention affords an operator much flexibility because, among other factors, there are many ways to adjust the key operating parameters of the Claus unit, most importantly including the Claus unit capacity.

EXAMPLE

A typical capacity for a sulfuric acid catalyzed alkylation unit in a refinery is 10,000 bbl/day of alkylate. The spent alkylation acid quantity generated from such a unit is about 110 tons per day. This liquid typically would in turn be decomposed in the regen furnace of a separate acid regeneration plant and generate about 70 t/d of $SO_2$ from which about 35 tons per day of sulfur could be recovered in the Claus unit.

A typical refinery also has one or several Claus units totalling more than 70 tons per day capacity. Therefore, the overall $H_2S/SO_2$ ratio will normally be greater than 2. This means that additional equipment to treat excess $SO_2$-rich gas will not be required. The $SO_2$ available from the SAR regen furnace could be used to debottleneck the Claus unit and/or to control the temperature of the Claus thermal reactor. If it is used to debottleneck the Claus unit, the extent of the debottlenecking will depend on the $SO_2$ concentration of the $SO_2$-rich gas and the nominal capacity of the Claus unit. The extent of debottlenecking can be further increased if $O_2$ is added in conjunction with $SO_2$. The extent of debottlenecking is reduced if $SO_2$ is not pure. For example 70 t/d of pure $SO_2$ may be used in accord with the invention to double the capacity of a 70 t/d air-based Claus unit, or alternatively to debottleneck by 70 t/d a larger capacity Claus unit.

Should the Claus unit be able to accommodate the resulting process gas flow, in practice the air flow may have to be reduced, and the reduced $O_2$ content in the resulting air flow may be at least partially replaced by pure oxygen, to achieve a proper minimum residence time.

We claim:

1. A process for the recovery of sulfur from sulfur-containing fluid mixtures, comprising the steps of:
   a) recovering a sulfur-dioxide-containing gas from a sulfuric acid treatment unit;
   b) feeding a $H_2S$-containing gas to a thermal reactor of a Claus unit;
   c) reacting at least a portion of said $SO_2$-containing gas in said Claus unit thermal reactor;
   d) controlling the temperature in the Claus unit thermal reactor by diverting a portion of said portion in step C of the $SO_2$-containing gas to a downstream catalytic Claus convertor without reacting the diverted $SO_2$ in the Claus thermal reactor, in an amount effective to maintain the average temperature in the Claus thermal reactor at less than 3250° F.; and
   e) recovering a sulfur product from said Claus unit.

2. The process as recited in claim 1 wherein said sulfur-dioxide-containing gas is recovered from a sulfuric acid regeneration plant which comprises dissociating said sulfuric acid to form a gas mixture comprising said sulfur dioxide-containing gas.

3. The process as recited in claim 2 wherein said sulfuric acid is dissociated in the presence of a mixture of fuel and oxygen-enriched gas.

4. The process as recited in claim 3 wherein said oxygen-enriched gas comprises greater than 21 percent oxygen.

5. The process as recited in claim 3 wherein said oxygen-enriched gas comprises greater than about 40 percent oxygen.

6. The process as recited in claim 3 wherein said oxygen-enriched gas comprises greater than about 95 percent oxygen.

7. The process as recited in claim 3 wherein said dissociating is carried out in a process comprising controlling the flow of a portion of said oxygen-enriched gas to a first stage of an acid regeneration process to result in incomplete combustion of said fuel mixture in said first stage.

8. The process as recited in claim 2 wherein said sulfuric-acid is fed to said sulfuric acid regeneration plant in a liquid waste comprising at least 5 percent by weight sulfuric acid and at least 10 percent of sulfur by weight.

9. The process as recited in claim 1 wherein said thermal reactor average temperature is between about 1650° F. and about 3200° F. provided thermal sulfur is produced.

10. The process as recited in claim 1 further comprising drying at least a portion of said sulfur-dioxide-containing gas recovered from said sulfuric acid treatment unit in a gas dryer to reduce the water concentration in said sulfur-dioxide-containing gas, and increase the sulfur-dioxide concentration in said sulfur-dioxide-containing gas to at least twenty-two percent by volume.

11. The process as recited in claim 1 comprising adjusting the effective $SO_2$ concentration in said sulfur-dioxide-containing gas recovered from said sulfuric acid treatment unit by treating at least a portion of said sulfur-dioxide-containing gas in at least one unit operation selected from the group consisting of a spray tower, a cooling tower, an electrostatic precipitator, a gas dryer and a $CO_2$ removal system prior to reacting at least a portion of said sulfur-dioxide-containing gas in said Claus thermal reactor.

12. The process as recited in claim 1 further comprising mixing a quantity of oxygen-enriched air with said sulfur-dioxide-containing gas to form a mixture prior to reacting said mixture in said Claus unit.

13. The process as recited in claim 12 wherein the oxygen concentration of said mixture is less than about 20%.

14. The process as recited in claim 12 further comprising adjusting the flow of said oxygen-enriched air based upon the flow rate of said sulfur-dioxide-containing gas to control the oxygen concentration of said mixture.

15. The process as recited in claim 1 wherein said sulfuric waste treatment unit comprises a SAR regeneration furnace and said sulfur-dioxide-containing gas is delivered to said Claus unit at a pressure of between about 15 psig and about 20 psig.

16. The process as recited in claim 15 further comprising pressurizing said SAR regeneration furnace.

17. The process as recited in claim 15 further comprising compressing said sulfur-dioxide-containing gas recovered from the effluent of said sulfuric acid regeneration unit furnace.

18. A process for the recovery of sulfur from sulfur-containing fluid mixtures, comprising the steps of:
   a) recovering a sulfur-dioxide-containing gas from a sulfuric acid treatment unit;
   b) feeding a $H_2S$-containing gas to a Claus thermal reactor;
   c) reacting at least a portion of said sulfur-dioxide-containing gas in said Claus thermal reactor; and
   d) controlling the temperature in the Claus unit thermal reactor by diverting a portion of said portion in step C of the $SO_2$-containing gas to a downstream catalytic Claus convertor without reacting the diverted $SO_2$ in the Claus thermal reactor, in an amount effective to maintain the average temperature in the Claus thermal reactor at less than 3250° F.

19. The process as recited in claim 18, further comprising the steps of:
   d) determining the volume ratio of $H_2S/SO_2$ at the inlet in said Claus thermal reactor;
   e) adjusting said volume ratio to a volume ratio greater than 2.

20. The process as recited in claim 19 wherein said adjusting comprises converting at least a portion of $H_2S$ in said $H_2S$-containing gas to $SO_2$ in a furnace prior to said thermal reactor.

21. The process as recited in claim 18, wherein at least a portion of said $H_2S$-containing gas is derived from a sour water stripper column.

22. A process for treating sulfur-containing waste streams comprising the steps of:
   a) recovering a quantity of sulfur-dioxide-containing gas from a sulfuric acid regeneration unit comprising a SAR regeneration furnace;
   b) feeding a first portion of said sulfuric-dioxide-containing gas to a Claus thermal reactor;
   c) diverting a portion of said first portion of said sulfuric-dioxide-containing gas to a downstream catalytic Claus converter without reacting diverted $SO_2$ in said thermal reactor, in an amount effective to maintain the average temperature in the Claus thermal reactor between about 1650° F. and about 3200° F.

23. The process as recited in claim 22 further comprising the steps of:
   a) feeding a portion of sour water stripper gas to said Claus thermal reactor;
   b) feeding a second portion of sour water stripper gas to the SAR regeneration furnace of said sulfuric acid regeneration unit;

c) adjusting the relative flow of said sour water stripper feeds of step a) and b) to control the temperature of said Claus thermal reactor.

24. The process as recited in claim 23 further comprising adjusting the sulfur-dioxide content of said sulfur-dioxide-containing gas from said SAR regeneration furnace by delivering and controlling a quantity of oxygen-enriched air to the burner of said SAR regeneration furnace.

* * * * *